H. MELLISH.
SPLINT MACHINE.
No. 8,017. Patented Apr. 1, 1851.
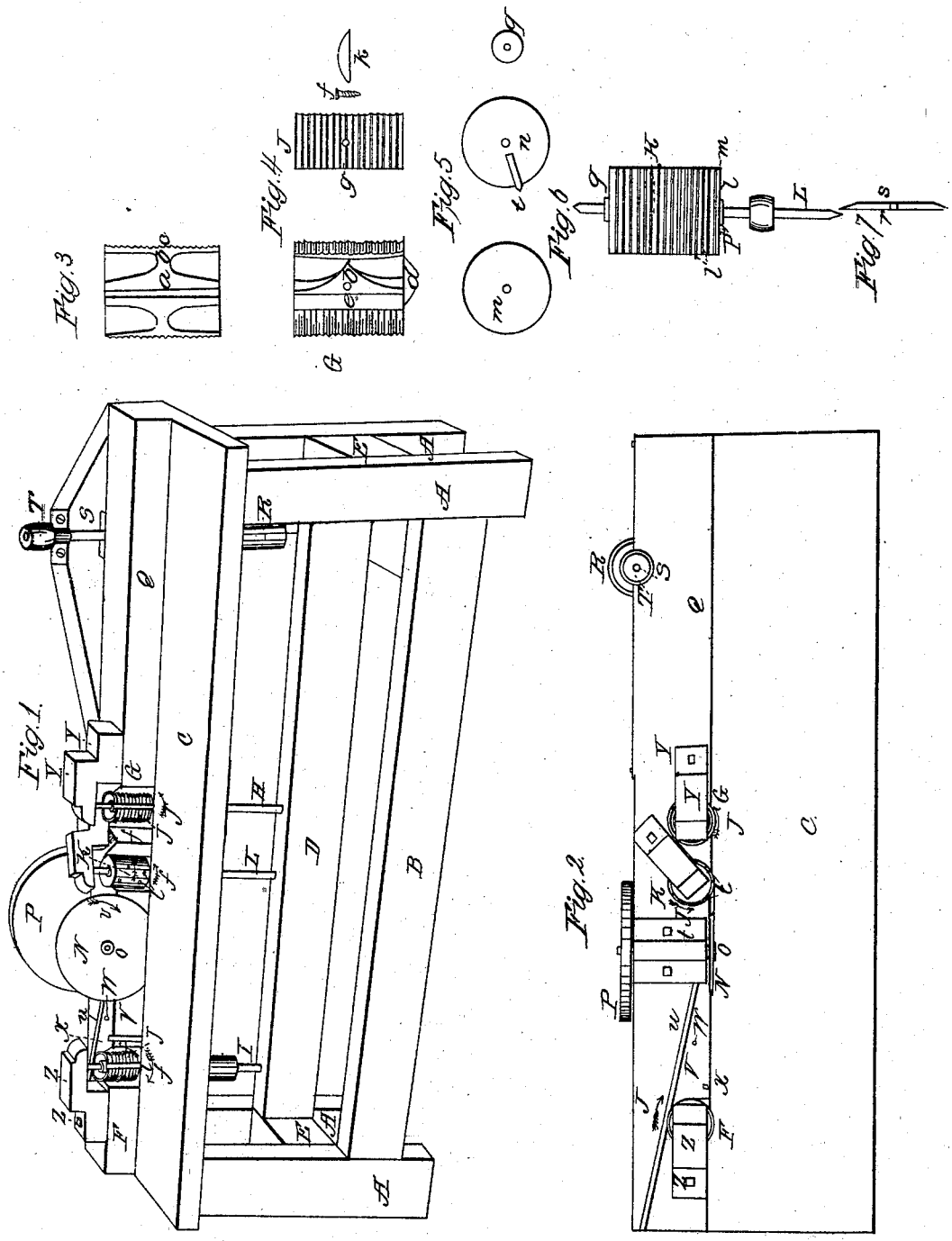

UNITED STATES PATENT OFFICE.

HENRY MELLISH, OF WALPOLE, NEW HAMPSHIRE.

SPLINT-MACHINE.

Specification of Letters Patent No. 8,017, dated April 1, 1851.

*To all whom it may concern:*

Be it known that I, HENRY MELLISH, of Walpole, in the county of Cheshire and State of New Hampshire, have invented a new and useful Improvement in Machinery for Making Match-Splints; and I do hereby declare that the following is a full and exact description of the same, reference being had to the annexed drawings, in which the same letters refer to the same parts in all the figures.

Figure 1, is a perspective view of the machine. Fig. 2, is a plan view of the top of the machine. Fig. 3, is a vertical sectional view of the grooved cylinders to which the cutters are attached. Fig. 4, is a side elevation view of one of the cylinders to which the cutters are attached, also a side and end view of its cutter. Fig. 5, is a plan view of the plates, spurs and collar, of which the spurred cylinder is made. Fig. 6, is a side elevation of the spurred cylinder on its arbor or shaft. Fig. 7, is a sectional view of the circular knife or cutter.

A A A A are the legs.

B is a front rail connecting the cross rails E E. The above described pieces constitute the frame work of the machine.

F and G, are two metallic cylinders on the shafts H and I. These cylinders have each a segment shaped cutter J made fast with a screw $f$ in a gain in its periphery, so as to form a part of the same. These cylinders and cutters having semicircular flutings or grooves around their peripheries of proper size to give form to one side of the match sticks or splints. Fig. 3, is a vertical sectional view of the cylinders F and G, (that view of either being the same) each of them consisting of a hub $a$, its flange $b$ and barrel $c$.

G in Fig. 4, is a side elevation of the cylinder G showing the gain $d$ to receive the cutter J, and the hole $e$ to receive the screw $f$ after passing it through the hole $g$ in the cutter J, and by which the cutter is screwed fast in its place. $k$ in this figure is an end view of the cutter J.

The cylinder F is made precisely like the one just described with the exception that its cutter J is placed on the opposite side of the mouth $i$ in the cylinder F (see Fig. 1,) so that the cutters will work when the cylinders revolve in opposite directions as indicated by the arrows J J.

K is a metallic cylinder on the shaft L with lance shaped spurs $l$ set around its periphery in a spiral manner and at proper distances apart along its length to divide the timber in one direction into the proper thickness for match splints. This cylinder is made up of a series of plates of metal, (see $m$ and $n$ Fig. 5) the plate $n$ having a slot cut in from the periphery toward the center to receive the spur $l$, which is represented filling the slot.

Fig. 6, is a side elevation of the cylinder K on its shaft L showing the manner of putting the plates together on the shaft.

Plate $m$ (Fig. 5.) is first placed on the shaft L so as to rest on the shoulder or collar $P^2$, the plate $n$ is placed next in succession on the shaft with its spur in the slot, thus alternating the plates until the cylinder is as long as required, the last plate in the series being a whole one as represented by $m$, the whole being made fast by screwing the nut or collar $q$ firmly down the shaft upon the last plate in the series (see $q$ Fig. 6). This method of constructing the spurred cylinder is adopted for the convenience of taking out and sharpening the spurs, and of supplying new ones in place of those that are broken or worn out.

N is a circular cutter or plate of steel on the arbor O with its front disk plane and its opposite one so beveled as to form a thin cutting edge at the periphery. See a sectional view of this cutter, Fig. 7, showing the line of its front disk at $r$, and its back or beveled disk at $s$, so that it will be seen that its edge at the periphery is a thin cutting or knife edge. The cutter arbor O turns in the box $t$ (see Fig. 2) and has on its opposite end its driving pulley P.

Q is a projection of the bed piece or table of the machine, its front ranging parallel to the bottoms of the grooves in the cylinders F and G.

R is the main driving cylinder on the shaft S (see Figs. 1 and 2).

T is a small pulley on the main shaft S for the purpose of driving the large pulley P and the cutter N with a slow motion.

V is a wedge shaped guide with its point behind and bearing against the circular cutter N and vibrating on the pin $w$, the bearing of its point against the cutter being made sure by the perpendicular spring $x$ in the table of the machine.

Y and Z are cap pieces bolted to the top of the machine and serve the purpose of boxes for the shafts H and I, the lower ends of these shafts being supported in the rail D.

$u$ is a channel in the projection Q of the bed piece or table of the machine, the guide V forming a part of one side of it.

Operation: Apply belting to the main driving cylinder R connecting it with the necessary motive power; also apply belting from the cylinder R onto the pulleys on the shafts H L and I so as to cause the cylinders F G and K to revolve in the direction indicated by the arrows $j\ j\ j$ (see Figs. 1 and 2) and also connect the small pulley T with the large one P by means of a belt so that it shall cause the cutter N to revolve in the direction indicated by the arrow $v$, when the necessary power is applied to put the machine in motion. Then lay the timber which should be in the form of plank on the table C of the machine, its edge against the projection Q at the right of the cylinder G, then shove the timber along to the left, still keeping it against the projection Q (which serves it as a guide) and when it comes in contact with the revolving cylinder G it will be seen that its cutter J (see Fig. 1) will cut under the grain on the edge of the timber and form beads on its edge corresponding with the grooves around the cylinder. Then by moving the timber still farther along in contact with the spurs of the cylinder K the spurs operating between the beads will divide them to the required depth for the thickness of the splints, and by moving it still farther along it comes next in contact with the circular cutter N; its thin cutting edge will pare the splints from the timber without any waste of the same. After the cutter N commences separating the splints from the timber and the timber still moving along it will be seen that the splints will be turned away from the cutter into the channel $u$ by the point of the guide V, in which they pass along beyond the guide and present their flat sides to the action of the cutter J of the cylinder F, which revolves in a direction opposite to that of cylinder G and which finishes them into round splints. The thick end of the guide V by the action of the spring X keeps the splints firmly against that part of the projection Q of the machine which forms the back part of the channel $u$. The back part of the channel just described having grooves in it in which the first rounded sides of the splints fit and pass along, and which, with the action of the guide V serve the purpose of keeping the splints in a proper position relative to the grooves in the cylinder F to give them a rounded form when acted upon by that cylinder.

To make square splints the grooved cylinders F and G are not used, the belts which drive them being thrown off and the cylinders thrown so far out of a perpendicular position as to clear them from contact with the timber as it passes along on the table of the machine, and which is to be effected by loosening the screw $y$ which holds the cap piece Y and swinging it round with the cylinder G toward the back part of the machine, and fastening it there with the screw $y$. The cylinder F is moved away from the channel $u$ by loosening the screw $z$ in the cap piece Z and swinging the cylinder end of the cap piece so far toward the front of the machine as to clear it the cylinder from the channel and it will not come in contact with the splints as they pass along in the channel. After preparing the machine for the purpose as above described, place the timber on the table of the machine as in the case of making round splints just described, and passing it along until it comes in contact with the spurs of the cylinder K which will divide the timber to a sufficient depth and at proper distances apart for match splints, and as the timber passes along to the cutter N the splints will be pared from it and pass through the channel $u$ as in the case of the round splints above described.

What I claim and desire to secure by Letters Patent is—

The combination of the cylinders F and G, with their cutters J J attached (for the purpose of giving a rounded form to the splints) and the cylinder K with its spurs $l$ (for the purpose of dividing the splints in one direction) with the circular cutter or saw N (for the purpose of separating the splints from the timber) and the guide V to guide the splints in the channel $u$, the whole being arranged substantially in the manner and for the purposes above set forth.

HENRY MELLISH.

Witnesses:
  CORNELIUS LANPHER,
  CLARISSA MELLISH.